United States Patent [19]

Queneau et al.

[11] 3,959,097
[45] May 25, 1976

[54] SELENIUM REJECTION DURING ACID LEACHING OF MATTE

[75] Inventors: Paul B. Queneau, Golden; Raymond D. Symens; Eddie C. Chou, both of Arvada, all of Colo.

[73] Assignee: Amax Inc., Greenwich, Conn.

[22] Filed: May 30, 1975

[21] Appl. No.: 582,101

[52] U.S. Cl................................. 204/108; 204/112; 210/50; 75/74; 75/101 R; 75/117; 75/119; 423/508; 423/509; 75/121
[51] Int. Cl.²........................................... C25C 1/12
[58] Field of Search ............. 210/50; 204/108, 112; 75/74, 101 R, 117, 119, 121; 423/508–509

[56] References Cited
OTHER PUBLICATIONS

"Nickel Refining in Finland," Canada Mining & Metallurgical Bull., June 1964, pp. 653–658.
"Atmospheric Leaching of Matte at the Port Nickel Refinery," Z. R. Llanos, C.M.M.B., Feb. 1974, pp. 74–81.

*Primary Examiner*—R. L. Andrews
*Attorney, Agent, or Firm*—Kasper T. Serijan; Eugene J. Kalil

[57] ABSTRACT

A method is provided for removing trace amounts of selenium from acid leach solutions containing over 2 ppm of total selenium comprising either Se(IV) and/or Se(VI) obtained during the pressure oxidation leaching of metal sulfide concentrate comprising forming a slurry of said acid solution with comminuted metal sulfide concentrate, said slurry containing at least two grams of a metal ion as metal hydroxide per liter of solution and then subjecting said slurry to agitation at a temperature of at least about 185°C at a pressure of a least about 160 psig, whereby to reduce the total selenium content of said solution to less than about 2 ppm.

7 Claims, 1 Drawing Figure

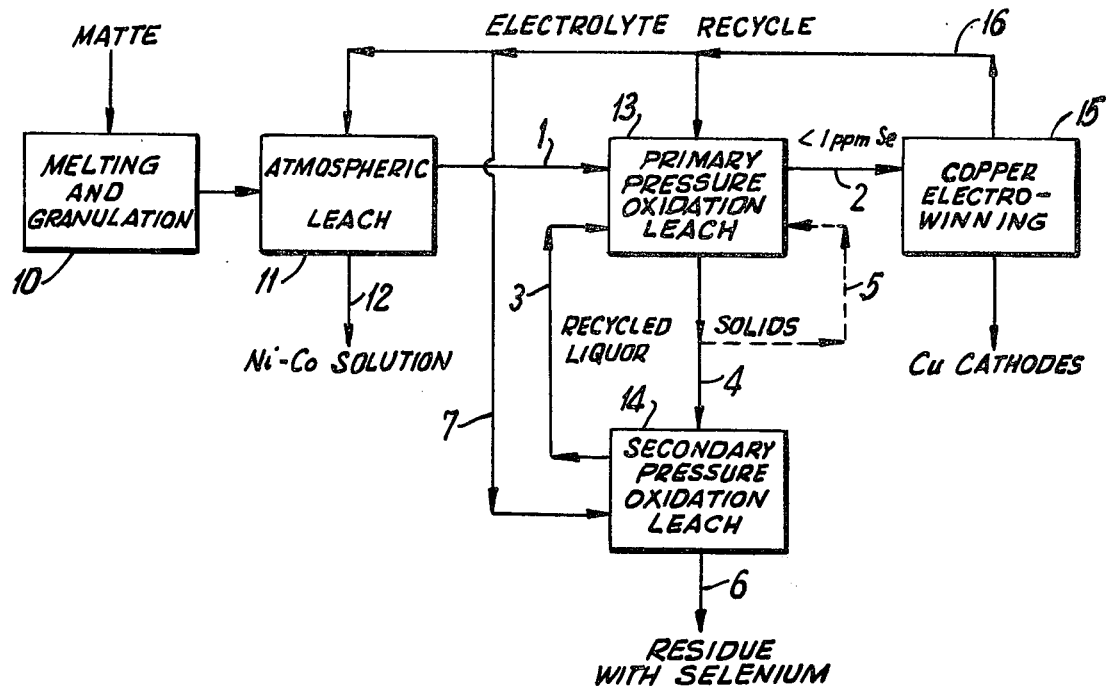

under which the metal hydroxide is formed in place. The metal hydroxide may be pre-formed and added as such. Thus, the selenium collector may be formed in place by adding a source of Fe++ ion to the slurry as ferrous sulfate and then aerating the slurry by means of which the Fe++ is oxidized to Fe+++ ion which then reacts with water to form Fe(OH)₃ in place. Some of the Se(VI) is reduced by the sulfide concentrate to Se(IV) while the pH rises to over about 4, whereby the selenium is collected or adsorbed on the ferric hydroxide with the collector containing the rejected selenium being then separated from the cleaned solution.

SELENIUM REJECTION DURING ACID LEACHING OF MATTE

This invention relates to the hydrometallurgical treatment of metal sulfide material, e.g. to the leaching of nickel-copper sulfide matte and, in particular, to a method of rejecting selenium from leach solutions, such as from copper electrowinning solutions obtained during the hydrometallurgical treatment of nickel-copper matte.

RELATED APPLICATION

In related application Ser. No. 536,383, filed Dec. 26, 1974 and assigned to the same assignee, a method is disclosed for leaching comminuted nickeliferous sulfide matte containing by weight about 20 to 75% nickel, about 5 to 50% copper, non-stoichiometric sulfur in the range of over 4 to about 20%, over 0.5 to about 15 or 20% iron, the sum of the nickel, copper, iron and sulfur contents being at least about 80% of the matte composition, with the balance gangue or slag and incidental impurities.

The matte is comminuted and subjected to atmospheric leaching to dissolve nickel selectively therefrom by preferbly using a spent copper electrolyte solution containing sulfuric acid having a pH ranging up to about 2 while aerating said solution to cause the pH to rise to above 5 and effect substantial precipitation of copper and iron, the copper and iron being each reduced in solution to less than 20 ppm as the pH rises to over about 5. The solution with dissolved nickel is separated from the nickel-copper containing residue for nickel recovery and the residue then subjected to sulfuric acid leaching at an elevated temperature and pressure to produce a pregnant solution containing substantial amounts of copper, the pregnant solution being thereafter subjected to electrowinning to remove copper and the spent electrolyte preferably recycled to the atmospheric leaching step.

Subsequent work has indicated that, in instances where the matte contains small but deleterious amounts of selenium as an impurity, sufficient amounts may be taken up by the leaching solution along with nickel and copper during pressure leaching, such as to enter the copper cathodes during the copper electrowinning step and adversely affect the hot working and electroconductive properties of electrolytic copper produced from the solution. While the copper bath can tolerate the presence of Se (VI), it is preferred that it be maintained as low as possible, otherwise, Se (VI) will come down with the nickel subsequently recovered from spent copper tankhouse electrolyte.

It is thus desirable and essential to remove the selenium prior to the copper electrowinning step.

STATE OF THE ART

Several methods have been proposed for removing selenium from copper solutions. One common method is to contact a solution with $SO_2$ gas as a reductant to precipitate out the selenium. Another method of removing selenium from solutions is to co-precipitate selenium (IV) with metal hydroxides which is a well known analytical technique. Another method proposed is the use of a fluidized bed of elemental copper to precipitate selenium from electrowinning feed solutions.

Some of the disadvantages of using the foregoing methods are as follows: (1) they may require a separate reactor; (2) they may require the use of reagents foreign to the system; (3) they may require that all of the selenium in the product liquor be present as Se(IV) rather then as Se(VI); and (4) some of the proposed methods may not result in a product liquor containing less than 2 ppm or 1 ppm of selenium. Moreover, they may not be sufficiently selective and effective in acid solutions.

Similar problems occur in the hydrometallurgical treatment of other sulfide materials, such as zinc sulfide concentrates and the like.

OBJECTS OF THE INVENTION

It is thus the object of the invention to reduce the selenium content of leach solutions obtained from the hydrometallurgical treatment of metal sulfide concentrates or mattes, such as nickel-copper sulfide concentrates or mattes, copper sulfide concentrates, zinc sulfide concentrates, and the like.

Another object is to reduce the selenium content of copper electrowinning solutions obtained as one of the by-product streams in the hydrometallurgical treatment of nickel-copper sulfide concentrates or mattes.

These and other objects will more clearly appear when taken in conjunction with the following disclosure, the claims and the accompanying drawing which is a flow sheet of a unit operation employed in the hydrometallurgical treatment of nickel-copper matte showing that part of the flow sheet in which the selenium is rejected from solution or prevented from going into solution.

STATEMENT OF THE INVENTION

In its broad aspects, the invention is directed to a method of producing acid leach solutions substantially free of aqueous selenium, for example, containing less than about 2 ppm of total selenium [Se(VI) plus Se(IV)], obtained from the hydrometallurgical treatment of metal sulfide concentrates or mattes. It is preferred in producing leach solutions containing less than about 2 ppm total selenium that the amount of Se(IV) present not exceed about 1 ppm and, more preferably, not exceed about 0.25 ppm weight.

Hereinafter, the term "concentrate" shall be employed to include metal sulfide materials obtained as a flotation product or as a pyrometallurgical product in the form of matte, both types of materials being also referred to in the art as metal sulfide intermediates. Examples of such materials are nickel-copper mattes, copper-iron mattes, zinc sulfide concentrates and the like.

In its preferred aspects, the invention is directed to the hydrometallurgical treatment of nickel-copper sulfide concentrates in which the selenium rejection step is carried out on the copper electrowinning solution before the solution is sent to copper recovery by electrolysis.

In carrying out the invention, it has been found that by forming a slurry of the acid selenium-containing leach solution with comminuted sulfide concentrate normally employed in the leaching circuit, or with atmospherically leached sulfide concentrate already in the leaching circuit, wherein said selenium-containing solution contains a selenium collector such as either a source of $Fe^{++}$ ion and air to generate $Fe(OH)_3$ in place or hydroxide or a metal hydroxide, such as $Ce(OH)_4$, Bi(OH)$_3$, In(OH)$_3$, Fe(OH)$_3$, PB(OH)$_2$, Be(OH)$_2$, Al(OH)$_3$, Cr(OH)$_3$, Ti(OH)$_4$, and the like, and by subjecting said slurry to agitation at a temperature of at least about 185°C and a pressure of at least about 160 psig, selenium in the form of Se(IV) immediately is taken up by said metal hydroxide present, whereby the leach solution is reduced of its selenium content or is prevented from containing more than 2 ppm of Se(IV) and generally contains less than 1 ppm of Se(VI). Any Se(VI) present is reduced in situ to Se(IV).

The foregoing treatment favors the formation of Se(IV) which is easily removed by the metal hydroxide precipitate present as compared to Se(VI), the removal of which is not as selective.

As stated hereinabove, the invention is particularly applicable to the hydrometallurgical treatment of nickel-copper sulfide matte or concentrate assaying about 20 to 75% Ni, about 5 to 50% Cu, up to about 20% Fe, and non-stoichiometric sulfur ranging from about 4 to 20%, the copper, nickel, iron and sulfur content generally being at least about 80% by weight, with the balance gangue and residuals. concept include The invention is also applicable to copper sulfide concentrates containing 15 to 45% Cu, 15 to 40% Fe, 20 to 45% S, the total copper, iron and sulfur content being at least about 80%, the balance being gangue and residuals. A sulfide comprised essentially of Cu$_2$S may similarly be treated as well as sphalerite concentrates (ZnS) and the like. Other concentrates which are particularly amenable to the foregoing concept include CuFeS$_2$ or Cu$_5$FeS$_4$ due to their ferrous iron content.

In the preferred hydrometallurgical treatment of the nickel-copper sulfide matte mentioned hereinabove, the matte is preferably provided as a granulated product obtained by quenching from above the liquidus solidus temperature. However, the matte need not be granulated. The matte is comminuted to the desirable size range and then subjected to atmosphere leaching to dissolve nickel selectively therefrom by using a spent copper electrolyte solution containing sulfuric acid at a pH ranging up to about 2 while aerating the solution.

During the foregoing leaching step, the pH of the solution rises to over 5, whereby any copper and iron in the solution is rejected so as to provide a pregnant solution containing nickel which goes to nickel recovery. The residue remaining is thereafter subjected to acid leaching at elevated temperature and pressure to provide the copper electrowinning solution for electrolytic copper recovery. It is at this part of the process in which the preferred aspects of the invention are carried out. Thus, the novel feature of the invention is in the recognition that pressure oxidation can be operated in a manner which simultaneously dissolves nickel and copper while obtaining almost total rejection of selenium.

An advantage of the invention resides in the fact that the leach residue from the atmosphere leach containing an effective amount of ferric hydroxide [coprecipitant for Se(IV)] achieves substantially total rejection of Se(IV), as the sulfides in the residue reduce Se(VI) to Se(IV) for removal by ferric hydroxide. Ferrous iron may assist in this reduction of hexavalent selenium to the quadravalent form. However, fresh unleached sulfide matte can achieve the same result as will be apparent from examples set forth hereinafter.

DETAILS OF THE INVENTION

In order to appreciate the novel characteristics of the invention, an actual leaching regime will be described in order to point out at what part of the process selenium enters the copper electrowinning solution.

A typical matte which is subjected to atmospheric leaching is one containing by weight 40% Ni, 39.5% Cu, 16.4% S, 0.2% Fe and the balance less than 0.5% each of impurities.

In leaching the foregoing matte, a slurry is produced with spent copper electrolyte from the copper electrowinning circuit containing about 20% solids, the pH of the solution being about 1 by virtue of the free acid present. The slurry is leached while being aerated until the pH reaches about 5.5 during which copper entering the solution is rejected together with iron which is precipitated as ferric hydroxide, a pregnant solution being formed containing substantial amounts of nickel. The residue remaining assays about 50% Cu, 21.5% Ni, 20% S, 0.2% Se, 0.2% Fe and the balance residuals, such as gangue, impurities, etc. As will be noted, the residue contains 0.2% Se which should not enter the resulting copper electrowinning solution.

The typical behavior of selenium in the foregoing residue will be apparent from a batch leaching test wherein the residue is pressure leached as follows.

A slurry of the residue was produced in water to provide a solids content of about 19%. The residue was pressure leached at 200°C under an air overpressure of 360 psig at 39 scfh per pound of residue. Sufficient acid was then added in a subsequent digestion step at ambient pressure and 60°C to bring the pH up to 1.5. The results are as follows:

Table 1

| Pressure Leaching Time, Minutes | % Ni and Cu Extraction | | Total Selenium in Filtrate, ppm. |
|---|---|---|---|
| | Ni | Cu | |
| 2 | 62 | 1 | 1 |
| 5 | 71 | 3 | 1 |
| 10 | 80 | 6 | 1 |
| 30 | 84 | 69 | 3 |
| 60 | 97 | 99 | 12 |

As will be noted from the table, the dissolution of selenium follows that of copper and reaches 12 ppm as the percent copper extraction reaches 99% which is desirable for optimum copper recovery. The natural affinity of selenium for the copper sulfide phase has been well documented (See *Mineralogy and Types of Deposits of Selenium and Tellerium*, N. D. Sindeeva, J. Wiley & Sons, New York, p. 272, 1964). The selenium does not rise above 1 ppm in solution until the copper sulfides are oxidized. Copper electrowinning solutions containing up to about 1 ppm Se(IV) and, preferably, not exceeding about 0.25 ppm, are desirable for producing copper cathodes sufficiently free of this impurity to meet conductivity requirements.

Additional pressure oxidation tests were conducted in the autoclave in which stoichiometrically required sulfuric acid was injected continuously during the first half hour of the test as follows:

Table 2

| Pressure Leaching Time, Minutes | % Ni and Cu Extraction | | Total Selenium in Filtrate, ppm |
|---|---|---|---|
| | Ni | Cu | |
| 5 | 20 | 3 | 0.1 |

Table 2-continued

| Pressure Leaching Time, Minutes | % Ni and Cu Extraction Ni | Cu | Total Selenium in Filtrate, ppm |
|---|---|---|---|
| 15 | 54 | 15 | 2 |
| 30 | 97 | 95 | 9 |

This acid addition to meet stoichiometric sulfur needs is required if economic rates of oxidation are to be attained.

As will be noted, the same trends are apparent. Little selenium dissolves initially until substantial quantities of copper go into solution. In either of the foregoing examples, high extractions of nickel and copper were not possible without also extracting substantial amounts of selenium.

However, we have found that, if the selenium contaminated electrowinning feed solution generated by pressure oxidation is briefly contacted at temperature with atmospheric leach residue or fresh unleached matte, selenium rejection results, provided a source of metal hydroxide is present, such as ferric hydroxide, to take up the selenium (IV) formed.

In one test, 100 grams of residue from the atmospheric leach were stirred for 15 minutes at 200°C with 900 ml of an electrowinning feed liquor A assaying 63 gpl Cu, 52 gpl Ni, 1.8 gpl Fe and 17 ppm Se. The liquor following treatment assayed 0.8 ppm Se, the pH being about two in order to assure the presence of hydrolyzed ferric hydroxide to take up the selenium.

To be sure that the selenium precipitation was not due only to absorption by hydrolyzed iron hydroxide, a second test was performed in which 11 grams of ferric iron as ferric sulfate was injected into the autoclave instead of matte or residue. The selenium concentration of the electrolyte after 15 minutes of residence time was 4 ppm. Repeating this test, using 2 grams of ferric ion addition instead of 11 resulted in 15 ppm Se remaining in solution.

Thus, the almost complete selenium rejection obtained during the first test with the sulfide residue cannot be attributed solely to iron coprecipitation.

The importance of temperature in achieving the results of the invention will be apparent from Table 3 below, the tests summarized therein being performed by adding 50 grams of the aforementioned leach residue to 500 ml of the electrowinning feed solution or liquor A referred to hereinabove.

Table 3

| Test No. | Solution Temp. °C | Reaction Time, Min. | Final Aqueous Selenium, ppm |
|---|---|---|---|
| 1 | 200 | 5 | 8.2 |
| 2 | 200 | 10 | 6.8 |
| 3 | 200 | 15 | 0.1 |
| 4 | 190 | 15 | 1.0 |
| 5 | 175 | 15 | 12.0 |
| 6 | 150 | 15 | 13.0 |

The foregoing tests were carried out under a pressure of 600 psig in the presence of air. These tests show that the sulfide residue is effective for rejecting selenium at temperatures over 175°C, for example, 185°C and above.

Another test was conducted using fresh unleached matte in place of the atmospheric leach residue. The matte assayed by weight 39.8% Ni, 28.4% Cu, 22.8% S and 4.3% Fe. The matte was comminuted so that 99% was minus 270 mesh, with 44% minus 400 mesh.

The foregoing matte (100 grams) was contacted at 200°C with feed liquor A containing 17 ppm Se. Also added to the system were 5 grams of iron in the form of ferric hydroxide, the following results being obtained:

Table 4

| Reaction Time, Min. | Final Aqueous Selenium, ppm |
|---|---|
| 1 | 4.0 |
| 5 | 3.0 |
| 15 | 0.5 |
| 30 | 0.5 |
| 60 | 1.0 |

At 15 minutes and above, substantially all of the selenium is removed. The residence time should be over 10 minutes and not be so long that the reductants (sulfide and ferrous iron) are so completely destroyed by air oxidation that the air then reoxidizes the selenium to soluble Se(VI).

The foregoing batch process for selenium rejection may be carried out in a semi-continuous operation. Such an operation is illustrated in the accompanying flow sheet of a unit operation starting with the preparation of the matte at 10 by granulation following which the matte is comminuted to the desired size, e.g. 99% through 270 mesh.

The comminuted matte assaying about 40% Ni, 36% Cu, 18% S and 4% Fe is subjected to atmospheric leaching at 11 using a spent electrolyte containing 31 gpl Ni, 22 gpl Cu and 46 gpl $H_2SO_4$, the amount of matte being proportioned to provide a pulp density of about 20%. The pulp is heated to 75°C and aerated while being agitated. The solution has a pH of about 1. The atmospheric leaching is carried out for a time sufficient to reach a pH of 5.5, such that the copper and iron in solution are rejected and nickel selectively leached from the matte. The residue contains ferric hydroxide useful to take up selenium (IV) in the subsequent pressure leaching step, as well as a source of $Fe^{++}$ (i.e., unleached iron sulfides). The nickel-containing solution 12 is sent to nickel and cobalt recovery, the residue 1 going to primary pressure oxidation leach at 13 where it meets the recycle liquor from secondary pressure oxidation leach 14 at a pH ranging from about 1.5 to 3.0 conducive to maintaining the iron as a hydrolyzed precipitate of ferric hydroxide. The temperature at the primary leach stage is 190°C, sulfuric acid, water, air and recycled spent electrolyte (30 gpl $Cu^{++}$, 160 gpl $SO_4^=$) (2 gpl $Fe^{++}$ and 2 gpl $Fe^{+++}$) being also added.

Retention time in primary leach 13 is sufficient to solubilize about ½ to ¾ and higher of the feed metal sulfides depending on the iron content thereof (stream 1 from atmospheric leach 11 and stream 5 recycled to primary leach as shown. Where the matte contains high iron, up to about 90% may be solubilized. The pregnant liquor generated as stream 2 has now been in contact for over 15 minutes with fresh atmospheric leach residue at 190°C and a pressure of about 600 psig (about 420 pounds of air and 180 pounds of steam) and is substantially stripped free of selenium and leaves the primary leach stage as stream 2 containing less than 1 ppm selenium (IV) which goes to copper electrowinning circuit 15 for copper recovery, the spent electrolyte 16 being recycled to atmospheric leach with a portion going as make-up solution to primary leach 13. Test results have indicated that the primary oxidation leach may be preferably performed in a one-stage continuously fed reactor.

Optionally, the slurry may be transferred to a second autoclave and maintained under pressure in the absence of air for a residence time sufficient (e.g. up to about 15 minutes, such as ½ to 5 minutes) to further effect the reduction of Se(VI) substantially to Se(IV).

The solid residue stream 5 is recycled back to primary leach 13. The recycling of solid residue 5 is continued without bleed until inert solubles, such as silica and iron oxide, build up to unacceptable levels. At this point, the whole primary leach residue (stream 4) is delivered to secondary pressure leach 14.

The secondary pressure leach is a batch operation and is run at 190°C with air and acid addition for a sufficient time to solubilize almost all of the nickel and copper values. Ferric iron is then added to carry down most of the selenium in the tails stream 6. Tests have indicated that the addition of ferric iron is expected to result in about 4 ppm Se in recycle stream 3. The volume of this stream is small compared to that of stream 2 and thus, the primary leach stage will re-precipitate this selenium so that stream 2 going to the copper electrowinning circuit will contain less than 2 ppm of Se(IV) and, more preferably, less than 1 ppm.

If aqueous iron in stream 7 coming from the spent electrolyte does not coprecipitate enough selenium into the final residue stream 6, a small portion of the atmospheric leach residue 1 may be directed to secondary leach to facilitate selenium rejection.

Generally speaking, the atmospheric leach is carried out at a temperature ranging from about 60° to 90°C, the primary pressure oxidation leach and the secondary pressure oxidation leach being carried out at a temperature exceeding 150°C and ranging up to about 210°C at a pressure ranging from about 200 psig to 800 psig. The pH of the pressure leach solution is at least about 2 and may range up to about 2 or 3 to assure the production of ferric hydroxide by hydrolysis in order to take up the selenium after its conversion to selenium (IV).

Indications are that trace amounts of chloride ions (e.g. about 5 to 30 ppm Cl$^-$) may help the reduction of Se(VI) to Se(IV), the chloride ion apparently catalyzing the reduction. High iron nickel-copper sulfide mattes (e.g. up to about 20% iron) generally deliver ferrous sulfide to pressure oxidation (i.e. FeS, FeNiS; or pyrite [FeS] may be added synthetically to the matte), the ferrous iron being important in reducing Se(VI) to Se(IV). The presence of 5 to 30 ppm Cl ions is also desirable for the ultimate copper electrowinning solution formed in that such trace amounts of chlorine are useful in producing smooth copper cathodes.

For the purposes of this invention, electrolyte copper produced in accordance with this invention is deemed to be substantially free of selenium when produced from copper electrowinning solutions containing up to about 0.25 ppm of Se(IV) and less than about 2 ppm total selenium.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for removing trace amounts of selenium from an acid leach solution containing over 2 ppm of total selenium which comprises, forming a slurry of said acid solution with comminuted metal sulfide concentrate,
   said slurry containing at least about 2 grams of a metal ion as insoluble metal hydroxide per liter of acid solution,
   and then subjecting said slurry to pressure oxidation while agitating said slurry at a temperature of at least about 185°C at a pressure of at least about 160 psig,
   whereby to reduce the total selenium content of said solution to less than 2 ppm total Se.

2. The method of claim 1, wherein said acid leach solution has a pH of over 1 to 3, wherein said metal hydroxide is ferric hydroxide and wherein the amount of selenium as Se(IV) does not exceed about 0.25 ppm.

3. The method of claim 2, wherein said acid leach solution is a copper electrowinning solution and wherein said selenium in said solution is reduced before said copper solution is subjected to electrolysis to recover substantially selenium-free copper therefrom.

4. A method for removing trace amounts of selenium from an acid leach solution containing over about 2 ppm total selenium and containing copper sulfate which comprises, forming a slurry of said solution with comminuted matte assaying about 20 to 75% Ni, 5 to 50% Cu, up to about 20% Fe and non-stoichiometric sulfur ranging from about 4 to 20%, the copper, nickel, iron and sulfur content being at least 80% by weight of said matte,
   said slurry also containing at least about 2 grams iron as ferric hydroxide per liter of solution,
   and subjecting said slurry to agitation at a temperature of at least about 185°C at a pressure of at least about 160 psig,
   whereby to reduce the total selenium content of said solution to less than about 2 ppm.

5. The method of claim 4, wherein the pH of said copper-containing solution ranges from about 1 to 3 and wherein the amount of selenium as Se(IV) does not exceed about 0.25 ppm.

6. The method of claim 5, wherein said acid leach solution is a copper electrowinning solution and wherein said selenium in said solution is reduced before said solution is subjected to electrolysis to recover substantially selenium-free copper therefrom.

7. A method for removing trace amounts of selenium from a copper-containing leach solution containing over 2 ppm total selenium which comprises, providing comminuted selenium-containing sulfide matte containing about 20 to 75% nickel, about 5 to 50% copper, non-stoichiometric sulfur in the range of over 4 to 20% and up to about 20% iron, the sum of the nickel, copper, iron and sulfur content being at least about 80%,
   subjecting said comminuted matte to atmospheric leaching to dissolve nickel selectively therefrom using a sulfuric acid-containing solution having a pH ranging up to about 2, while aerating said solution,
   said atmospheric leach being conducted for a time sufficient until the pH of said solution exceeds 5 and decreases substantially the copper and iron in said solution, thereby forming a pregnant solution containing nickel and forming a nickel-copper sulfide residue containing said selenium and a ferric hydroxide precipitate, transferring said nickel-copper sulfide residue to a primary pressure oxidation leach stage where said residue is slurried with a sulfuric acid-containing solution at a pH of over about 1 and ranging up to about 3 and containing at least 2 grams of iron as ferric hydroxide per liter of solution, pressure oxidation leaching said residue at a temperature over 150°C and ranging up to about 210°C and a pressure ranging from about 200 psig to 800 psig at a residence time at least sufficient to provide a copper-containing electrowinning solution containing less than about 2 ppm of total selenium, with selenium as Se(IV) not exceeding about 0.25 ppm, passing said copper electrowinning solution to a copper electrowinning circuit to recover copper therefrom electrolytically and form a spent electrolyte, passing the residue from said primary leach to a secondary leach step and subjecting said residue to pressure leaching under substantially the same conditions as said primary leach, continuously recycling pregnant liquor from said secondary leach to said primary leach to remove total selenium therefrom to below 2 ppm and from said copper electrowinning solution, and recycling said spent copper electrolyte to said atmospheric leach, such that electrolytic copper is produced substantially free from selenium and such that the spent electrolyte which usually contains nickel is sufficiently low in Se(VI) to permit the efficient production of substantially selenium-free nickel products.

* * * * *